US006216454B1

(12) United States Patent
Tsuzuki

(10) Patent No.: US 6,216,454 B1
(45) Date of Patent: Apr. 17, 2001

(54) TORQUE CONVERTER

(75) Inventor: Yukihisa Tsuzuki, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/144,273

(22) Filed: Aug. 31, 1998

(30) Foreign Application Priority Data

Aug. 29, 1997 (JP) .................................. 09-233570

(51) Int. Cl.⁷ ..................................................... F16D 33/00
(52) U.S. Cl. ........................ 60/362; 60/341; 416/197 C; 416/228
(58) Field of Search .................................... 415/191, 188, 415/186; 416/197 C, 180, 228, 235, 223 R, 223 A; 60/341, 362 OR, 361

(56) References Cited

U.S. PATENT DOCUMENTS

| 2,961,830 | * | 11/1960 | Dundore et al. | 60/361 |
| 4,180,978 | | 1/1980 | Maddock . | |
| 4,848,084 | * | 7/1989 | Wirtz | 60/342 |
| 5,271,716 | * | 12/1993 | Ejiri | 416/197 C |
| 6,003,311 | * | 12/1999 | Takada et al. | 416/197 C |

FOREIGN PATENT DOCUMENTS

| 9-14388 | * | 1/1997 | (JP) | 416/197 C |
| 10-252858 | * | 9/1998 | (JP) . | |

* cited by examiner

*Primary Examiner*—Edward K. Look
*Assistant Examiner*—Richard Woo
(74) *Attorney, Agent, or Firm*—Burns, Doane, Swecker & Mathis, LLP

(57) ABSTRACT

A torque converter is designed to control the torque capacity C and prevent a constant torque capacity C when the speed ratio E is in the middle to high operational range. The torque converter includes a bladed pump impeller driven by an internal engine, a bladed turbine runner in fluid flow relation with the pump impeller, and a bladed stator for redirecting fluid to produce a toroidal flow path of hydraulic fluid. The blades of the stator have an inlet portion facing the turbine runner and to which flows hydraulic fluid from the turbine runner, an outlet portion facing the pump impeller and discharging hydraulic fluid from the stator, a pressure surface disposed on one side of the blade between the inlet portion and the outlet portion, a suction surface disposed on another side of the blade, and a plate portion disposed near the inlet portion.

8 Claims, 5 Drawing Sheets

TORQUE CONVERTER

This application corresponds to and claims priority under 35 U.S.C. § 119 with respect to Japanese Application No. 09(1997)-233570 filed on Aug. 29, 1997, the entire content of which is incorporated herein by reference.

FIELD OF THE INVENTION

The present invention generally relates to a torque converter located between an internal engine and an automatic transmission. More particularly, the present invention pertains to the construction of stator blades used in such a torque converter.

BACKGROUND OF THE INVENTION

One type of a torque converter is described in U.S. Pat. No. 4,180,978. This torque converter includes a pump impeller having a plurality of blades, a turbine runner, and a stator. The pump impeller is driven by the internal engine and is adapted to absorb torque from the engine. The turbine runner is in fluid flow relation with the pump impeller. The stator redirects fluid from the turbine runner to the pump to produce a toroidal flow path of hydraulic fluid. The blades of the pump impeller have a negative tip angle displaced in the range of 20 degrees to 30 degrees from the toroidal flow path at the fluid outlet of the pump impeller. Further, the blades of the stator have a sharp nose displaced circumferentially and angularly from the entrance flow to the stator from the turbine runner to induce turbulence in the toroidal flow path at the stator inlet at stall speeds.

In the apparatus, when the speed ratio E is small, that is to say that the turbine runner does not rotate in spite of rotating the pump impeller, the torque capacity C becomes small. The speed ratio E is the rotational speed of the turbine runner divided by the rotational speed of the pump impeller. The torque capacity C is equal to $Tp/Ne^2$, where Tp equals the pump impeller torque and Ne equals the rotational number. The torque capacity C is one of the factors deciding the peak torque of the engine. Therefore, when the engine is idling, the fuel expense of the engine becomes economical.

However, in the apparatus described above, the torque capacity C is not controlled when the speed ratio is in both the middle range and the high range. Therefore, the peak torque of the engine become small such that the fuel expense is not economical.

A need thus exists for a torque converter in which during a middle and high range of operation, the torque capacity is controlled to be generally constant and less than in other known torque converters.

SUMMARY OF THE INVENTION

The present invention provides a torque converter that includes a bladed pump impeller driven by an internal engine, a bladed turbine runner in fluid flow relation with the pump impeller, and a bladed stator for redirecting fluid from the turbine runner to the pump impeller to produce a toroidal flow path of hydraulic fluid. The blades of the stator have an inlet portion facing the turbine runner and to which flows hydraulic fluid from the turbine runner, an outlet portion facing the pump impeller and discharging hydraulic fluid from the stator, a pressure surface disposed on one side of the blade between the inlet portion and the outlet portion, a suction surface disposed on another side of the blade, and a plate portion disposed near the inlet portion.

According to another aspect of the present invention, a torque converter includes a bladed pump impeller driven by an internal engine, a bladed turbine runner in fluid flow relation with the pump impeller, and a bladed stator for redirecting fluid to produce a toroidal flow path of hydraulic fluid. The blades of the stator have an inlet portion facing the turbine runner and to which flows hydraulic fluid from the turbine runner, an outlet portion facing the pump impeller and discharging hydraulic fluid from the stator, a pressure surface disposed on one side of the blade between the inlet portion and the outlet portion, and a suction surface disposed on another side of the blade. The blades of the stator are also configured to cause disorderly flow of the hydraulic fluid when the ratio of the speed of rotation of the pump impeller and the speed of rotation is less than a predetermined value reduce the torque capacity of the torque converter and produce a substantially constant torque capacity.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein.

DETAILED DESCRIPTION OF A PREFERRED EMBODIMENT

Figure 1:
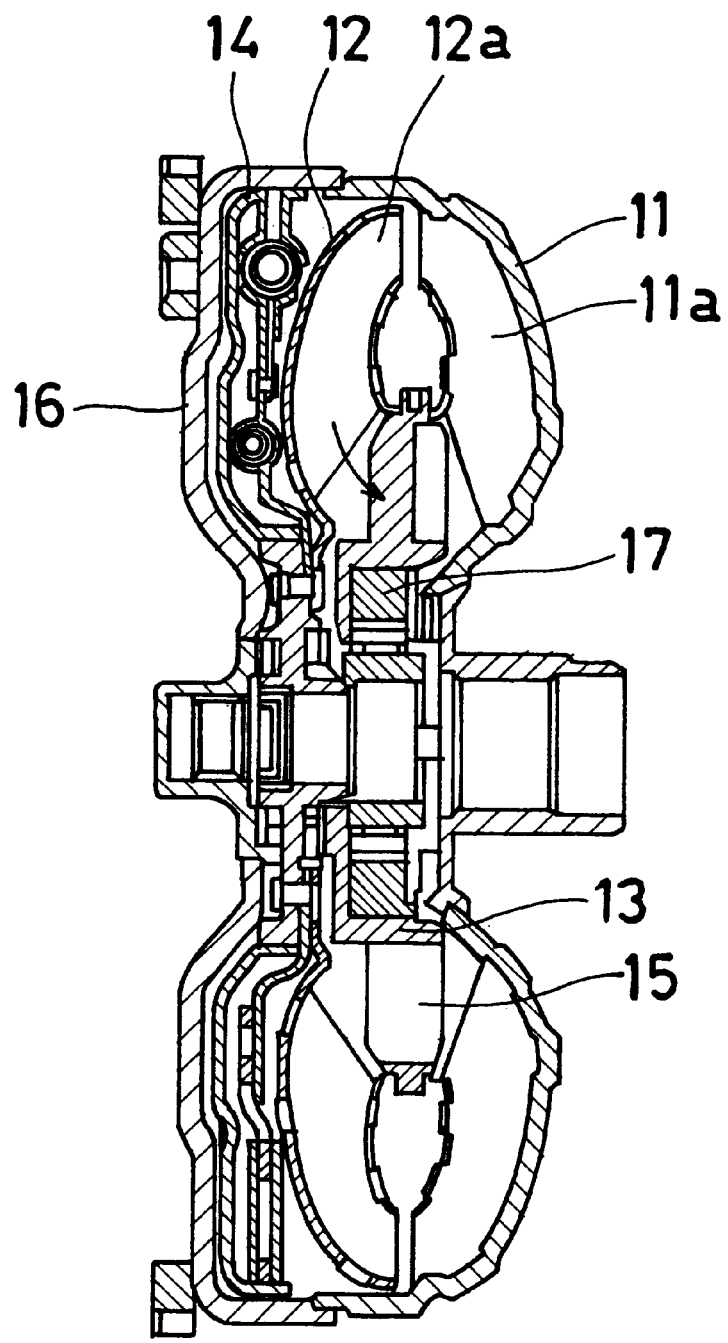
FIG. 1 is a cross-sectional view of a torque convertor in accordance with the preferred embodiment of the present invention.

With reference to FIG. 1, a torque converter 10 used with a vehicle automatic transmission includes a pump impeller 11, a turbine runner 12, a stator 13 and a lock up clutch 14. The pump impeller 11 includes a plurality of pump blades 11a and is secured to a front cover 16 that is adapted to be connected to an engine (not shown). The turbine runner 12 is disposed on the opposite side of the pump impeller 11 and includes a plurality of turbine blades 12a. The turbine runner 12 is connected with an input shaft (not shown) of the automatic transmission. The stator 13 is disposed between the pump impeller 11 and the turbine runner 12.

The stator 13 includes a plurality of stator blades 15 for directing hydraulic fluid from the pump impeller 11 to the turbine runner 12. The hydraulic fluid flows into the stator 13 from the turbine runner 12 in the direction of the arrow shown in FIG. 1. The stator 13 is disposed on a stator shaft via a one-way clutch 17 such that the stator 13 is able to rotate in only one direction that is the same as the rotational direction of the pump impeller 11 and the turbine runner 12.

Figure 2:
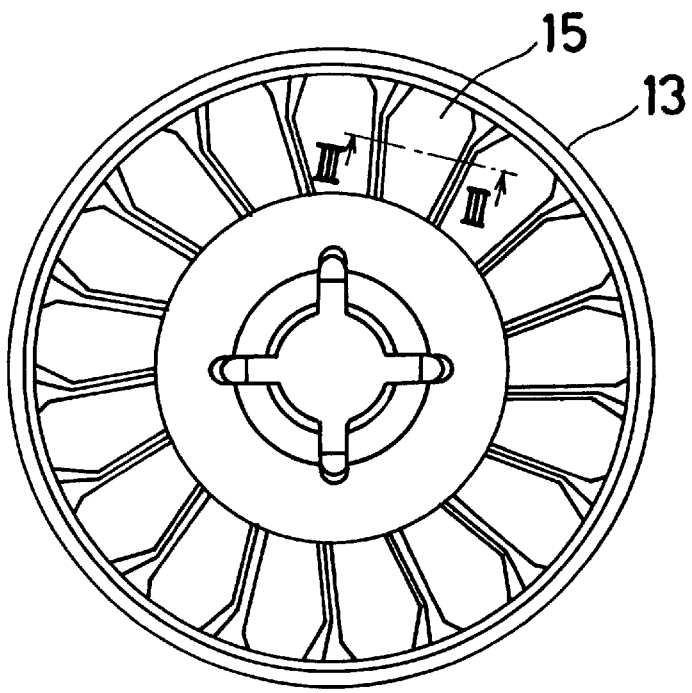
FIG. 2 is a front view of a stator used in the torque convertor of the present invention.

The front view of the stator 13 shown in FIG. 2 depicts the stator as shown from the turbine runner 12. The plurality of stator blades 15 are disposed in a ring along the outline of the stator 13.

Figure 3:
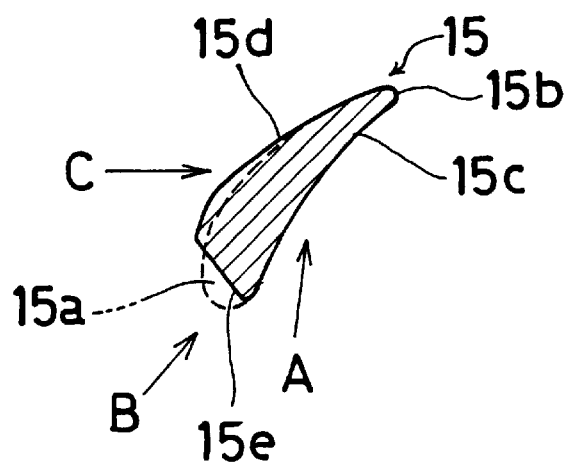
FIG. 3 is a cross-sectional view taken along the section line III—III in FIG. 2.

As illustrated in FIG. 3 which is a cross-sectional view taken along the section line III—III in FIG. 2, each of the blades 15 of the stator includes an inlet portion 15a and an outlet portion 15b that are positioned opposite one another, a generally curved pressure surface 15c and a generally curved suction surface 15d that are positioned opposite one another, and a generally planar plate portion 15e. The inlet portion 15a is located at the opposite side of the turbine runner 12. The outlet portion 15b is located at the opposite side of the pump impeller 11. The pressure surface 15c is disposed on one side of the stator blade 15 between the inlet portion 15a and the outlet portion 15b. The suction surface 15d is disposed on the other side of the stator blade 15 between the inlet portion 15a and the outlet portion 15b. The plate portion 15e is disposed near the inlet portion 15a.

Figure 4:
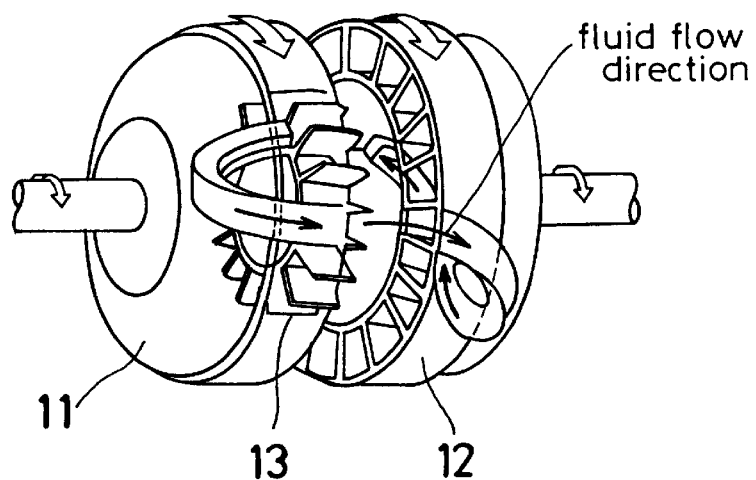
FIG. 4 is a perspective view of the pump impeller, the stator and the turbine runner used in the torque convertor of the present invention.
Figure 5:
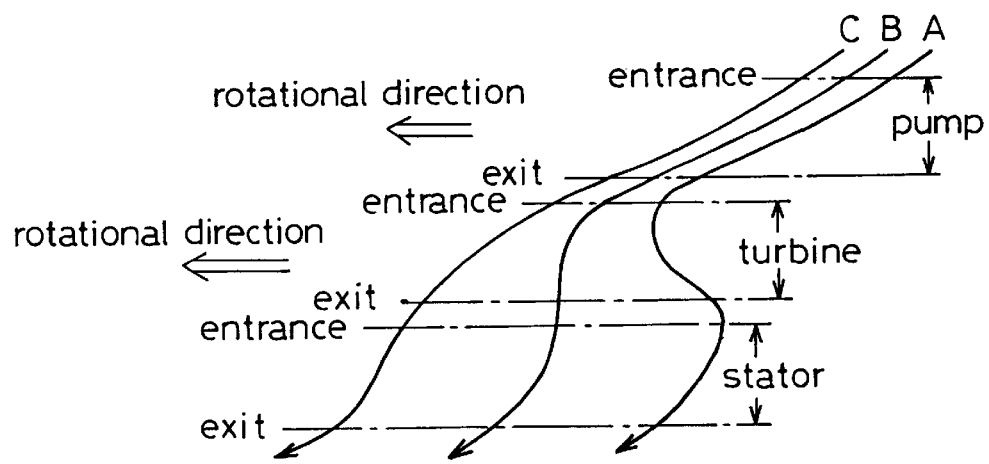
FIG. 5 is an illustration of the relationship between the pump impeller, the turbine runner and the stator used in the torque convertor of the present invention.

FIG. 4 and FIG. 5 illustrate the relationship between the pump impeller 11, the turbine runner 12 and the stator 13 for explaining the toroidal flow path of the hydraulic fluid. When the pump impeller 11 is rotated by the engine in the direction of the arrow in FIG. 4, hydraulic fluid in the center of the pump impeller 11 is forced out to the turbine runner 12 along the pump impeller housing and the pump blades 11a as shown in FIG. 1. The turbine runner 12 receives the hydraulic fluid at the outer end of the turbine runner 12. The hydraulic fluid flows to the center of the turbine runner 12 along the turbine blades 12a, whereby the flow of hydraulic fluid forces the turbine runner 12 to rotate in the same direction as the rotating direction of the pump impeller 11. The stator 13 is disposed between the outlet portion of the turbine runner 12 and the inlet portion of the pump impeller 11 so as to change the flow direction of the hydraulic fluid to correspond with the rotational direction of the pump impeller 11.

Figure 6:
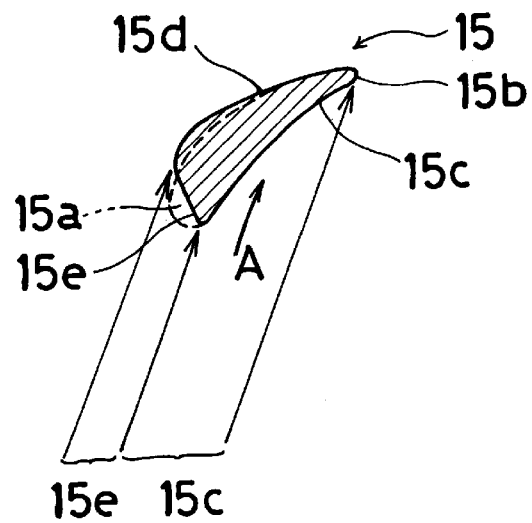
FIG. 6 is a perspective view of one of the stator blades illustrating the fluid flow when the turbine runner is not rotating.

At the entrance of the stator 13, the flow direction of the hydraulic fluid is varied according to the rotational speed of the turbine runner 12. As shown in FIG. 5, the line A shows the route of the flow of the hydraulic fluid when the turbine runner 12 does not rotate. The arrows shown in FIG. 5 illustrate the rotational direction of both the pump impeller 11 and the turbine runner 12. In this situation, the flow direction of the hydraulic fluid is represented by the arrow A in FIG. 3. As shown, most of the flow is along the pressure surface 15c of the stator blade 15 and a little flow runs into the plate portion 15e. Therefore, the flow direction of the hydraulic fluid is able to correspond with the rotational direction of the pump impeller 11 without a resistance occurring by the plate portion 15e. FIG. 6 also illustrates the flow along the pressure surface 15c as represented by the arrow A when the turbine is not rotating.

Figure 7:
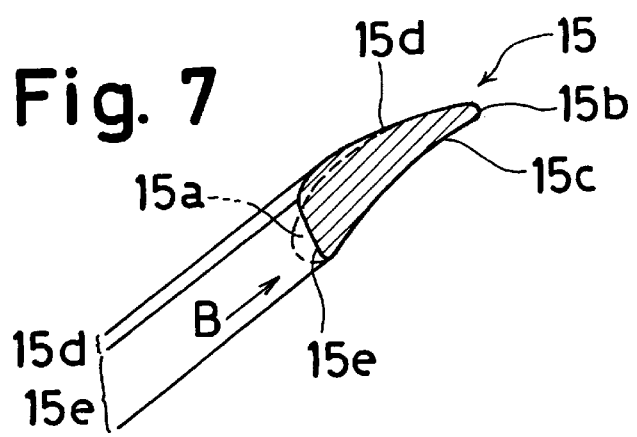
FIG. 7 is a perspective view of one of the stator blades illustrating the fluid flow when the turbine runner is rotating at about 50% the rotational speed of the pump impeller.

The line B shown in FIG. 5 shows the route of the flow of the hydraulic fluid when the turbine runner 12 rotates at a speed of 50% of the rotational speed of the pump impeller 11. In this situation, the flow direction of the hydraulic fluid is represented by the arrow B in FIG. 3. Here, most of the flow runs into or at the planar plate portion 15e and there thus occurs some resistance. Therefore, the flow acts to restrain the pump impeller 11 from rotating such that the torque capacity TC becomes small. FIG. 7 also illustrates the fluid flow when the turbine runner 12 rotates at a speed of about 50% of the rotational speed of the pump impeller 11. The operation or rotation of the turbine runner 12 at this relative speed causes the fluid to flow along the direction of the arrow B in FIG. 7 so that the fluid impacts upon or collides with the planar portion 15e of the blade 15 of the stator to effect disorderly flow, with the torque capacity being significantly decreased.

Figure 8:
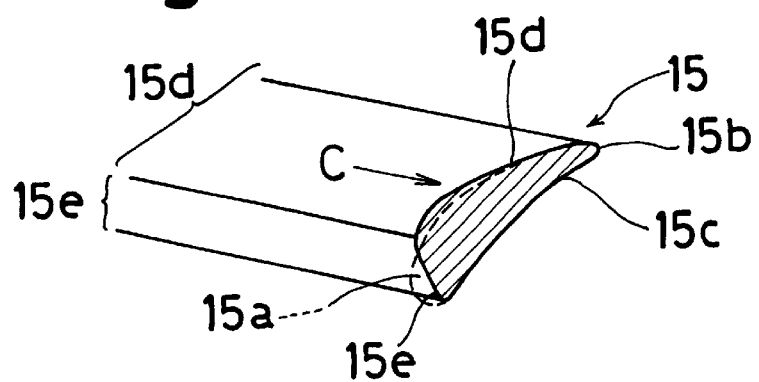
FIG. 8 is a perspective view of one of the stator blades illustrating the fluid flow when the turbine runner is rotating at about 90% the rotational speed of the pump impeller.

The line C shown in FIG. 5 represents the route of the flow of the hydraulic fluid when the turbine runner 12 rotates at a speed of 90% the rotational speed of the pump impeller 11. In this situation, the flow direction of the hydraulic fluid is represented by the arrow C in FIG. 3 where most of the flow is along the suction surface 15d of the stator blade 15 and a little flow runs into the plate portion 15e. Therefore, the flow direction of the hydraulic fluid is able to correspond with the rotational direction of the pump impeller 11 without a resistance occurring by the plate portion 15e. FIG. 8 also shows the flow of the fluid when the turbine runner 12 rotates at a speed of 90% the rotational speed of the pump impeller 11 and illustrates that the rotation of the turbine runner 12 at this relative speed cause the fluid to flow in the direction of the arrow C so that the majority of the flow is along the suction surface 15d of the blade 15.

Figure 9:
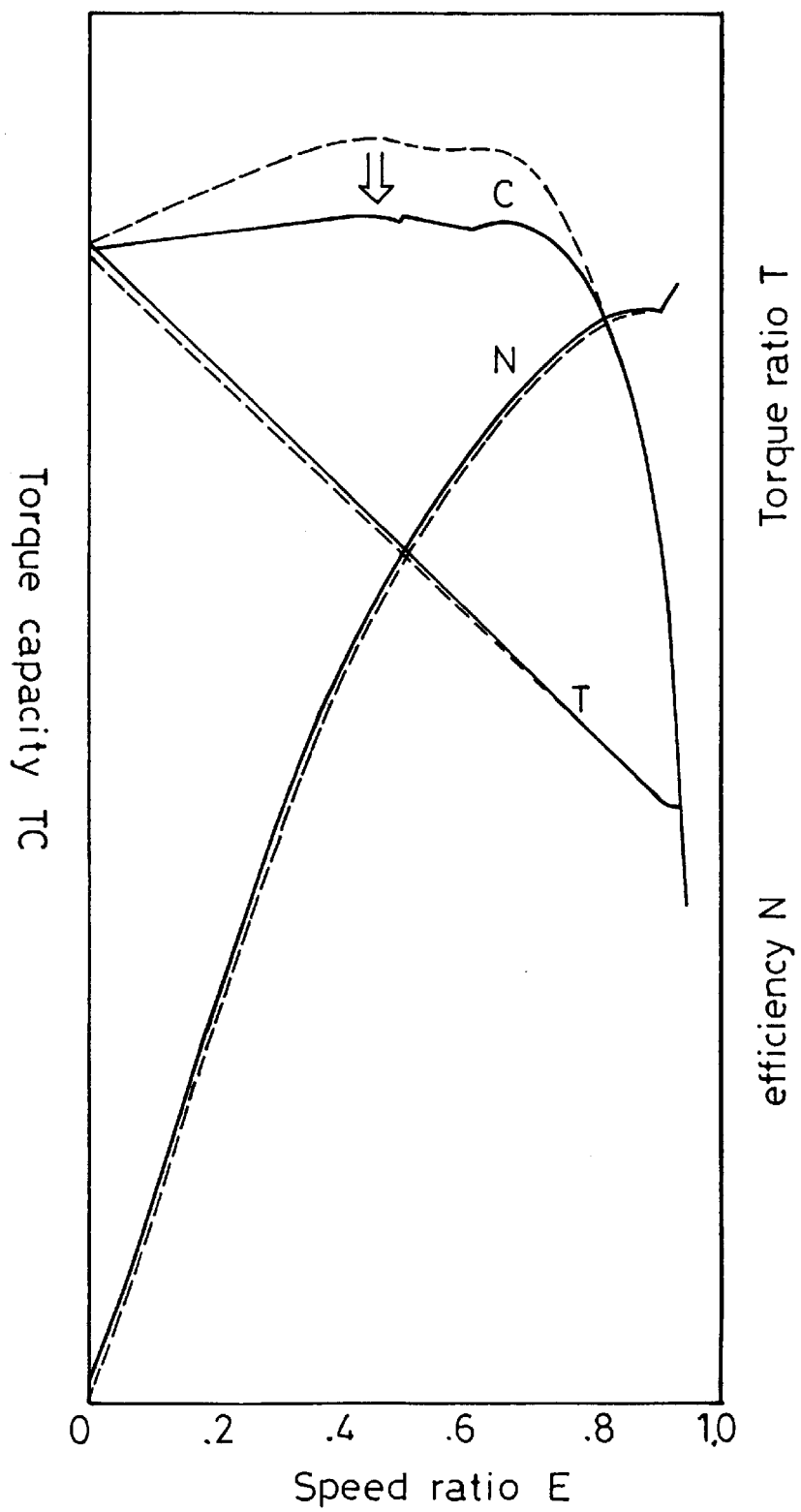
FIG. 9 is a graph illustrating the torque capacity TC, the torque ratio T and the efficiency N of the torque converter according to the present invention relative to another known type of torque converter.

FIG. 9 shows the relationship between the torque capacity TC, the speed ratio E and the efficiency N of the torque converter of the present invention. The speed ratio E represents the rotational speed of the turbine runner 12 divided by the rotational speed of the pump impeller 11. As illustrated in FIG. 9, because the stator blade 15 includes the planar or plate portion 15e, the fluid colliding with the planar portion 15e causes disorderly flow and the torque capacity TC of the torque converter becomes small. In particular, when the speed ratio E is in the range from about 0.3 (30%) to about 0.7 (70%), the amount of reduction of the torque capacity TC is large and the torque capacity TC is generally constant. On the other hand, the torque ratio T and the efficiency N are generally the same as in the case of known torque converter constructions. The torque ratio T represents the torque of the turbine runner 12 divided by the torque of the pump impeller 11. The efficiency N is equal to the torque ratio T times the speed ratio E.

The present invention thus provides a torque converter in which over a predetermined speed ratio range of about 0.3 to 0.7, the torque capacity is maintained generally constant while at the same time being reduced as compared to other known torque converter constructions.

The principles, a preferred embodiment and the mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A torque converter comprising:
   a bladed pump impeller adapted to be driven by an internal engine;
   a bladed turbine runner in fluid flow relation with the pump impeller; and a stator provided with blades and adapted to redirect hydraulic fluid from the turbine runner to the pump impeller to produce a toroidal flow path of the hydraulic fluid, said blades of the stator having an inlet portion facing the turbine runner and into which the hydraulic fluid flows from the turbine runner, an outlet portion facing the pump impeller and discharging the hydraulic fluid from the stator, a pressure surface disposed on one side of the blade between the inlet portion and the outlet portion, a suction surface disposed on another side of the blade and a plate portion disposed near the inlet portion so as to be located at the suction surface side, the plate portion being positioned so that the hydraulic fluid from the turbine runner impacts the plate portion to effect disorderly flow, without changing the distance between the inlet portions of adjacent blades, when a predetermined rotational speed difference exists between the turbine runner and the pump impeller.

2. A torque converter according to claim 1, wherein the plate portion is disposed so that the hydraulic fluid from the turbine runner impacts upon the plate portion when the turbine runner rotates at a speed that is 70% or less than the rotational speed of the pump impeller.

3. A torque converter comprising:

a pump impeller adapted to be driven by an internal engine, said pump impeller having a plurality of blades;

a turbine runner in fluid flow relation with the pump impeller, said turbine runner having a plurality of blades; and a stator for redirecting hydraulic fluid to produce a toroidal flow path of the hydraulic fluid, said stator having a plurality of blades, each of said plurality of blades of the stator possessing an inlet portion facing the turbine runner and into which the hydraulic fluid flows from the turbine runner, an outlet portion facing the pump impeller and discharging the hydraulic fluid from the stator, a pressure surface disposed one side of the blade between the inlet portion and the outlet portion, a suction surface disposed on another side of the blade, and means positioned near the inlet portion so as to be located at the suction surface side for causing disorderly flow of the hydraulic fluid, without changing the distance between the inlet portions of adjacent blades, when a predetermined rotational speed difference exists between the pump impeller and the turbine runner.

4. A torque converter according to claim 3, wherein said means includes a substantially planar portion on the blade of the stator.

5. A torque converter according to claim 4, wherein said means is disposed at said inlet portion.

6. A torque converter according to claim 3, wherein said means causes disorderly flow of the hydraulic fluid when the turbine runner rotates at a speed that is 70% or less than the rotational speed of the pump impeller.

7. A torque converter according to claim 3, wherein said means causes disorderly flow of the hydraulic fluid when the ratio of the speed of rotation of the turbine runner and the speed of rotation of the pump impeller is greater than a predetermined value.

8. A torque converter according to claim 3, wherein said means causes disorderly flow of the hydraulic fluid when the ratio of the speed of rotation of the turbine runner and the speed of rotation of the pump impeller is greater than about 0.3.

* * * * *